United States Patent [19]
Ryder

[11] 3,747,657
[45] July 24, 1973

[54] NUT TYPE FASTENER
[75] Inventor: Francis E. Ryder, Barrington, Ill.
[73] Assignee: Value Engineered Components, Inc., Streamwood, Ill.
[22] Filed: Apr. 23, 1971
[21] Appl. No.: 136,722

[52] U.S. Cl. .............................. 151/41.7, 151/37
[51] Int. Cl. .......................................... F16b 39/00
[58] Field of Search ..................... 151/41.7, 37, 7

[56] References Cited
UNITED STATES PATENTS

| | | | |
|---|---|---|---|
| 3,298,271 | 1/1967 | Krueger | 151/7 |
| 2,235,078 | 3/1941 | Meisterhans | 151/41.7 |
| 2,292,239 | 8/1942 | Pierce et al. | 151/37 |
| 2,426,653 | 9/1947 | Whelan et al. | 151/41.7 |
| 2,665,730 | 1/1954 | Trumble | 151/41.7 |
| 2,707,507 | 3/1955 | Tripp et al. | 151/41.7 |
| 2,908,309 | 10/1959 | Brill | 151/7 |
| 3,119,430 | 1/1964 | Rico | 151/7 |
| 3,179,143 | 4/1965 | Schultz et al. | 151/41.7 |

Primary Examiner—Edward C. Allen
Attorney—Olson, Trexler, Wolters & Bushnell

[57] ABSTRACT

The present invention relates generally to nut-type fasteners for application to an apertured panel and more particularly to nut-type fasteners which may be adhesively attached to one side of an apertured panel to facilitate subsequent application of a fastener shank thereto. An embodiment of the invention disclosed herein includes an integral nut-body having a first section adapted to be telescopically inserted within a complementary aperture in a panel. Radiating from the base of said section is a second section of greater diameter providing a panel clamping surface. A sealing type adhesive associated with said clamping surface serves to adhere the nut body to the panel surface upon telescopic association of the first section with a complementary panel aperture whereby to position an axial aperture in the body for receiving a fastener shank, as for example the threaded shank of the screw member.

2 Claims, 12 Drawing Figures

PATENTED JUL 24 1973
3,747,657
SHEET 1 OF 2
FIG. 1
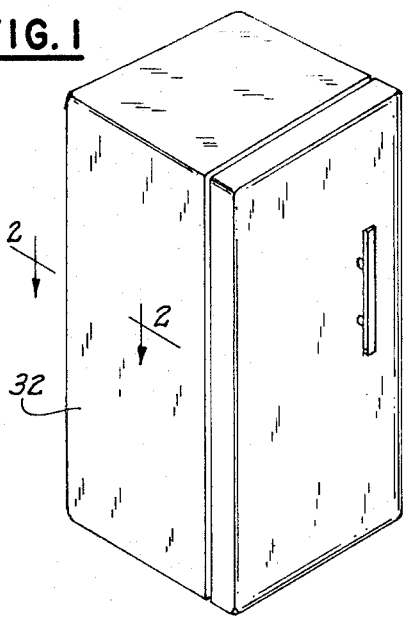
FIG. 2
FIG. 3
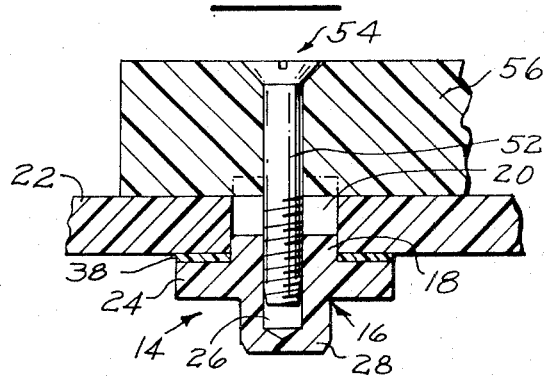
FIG. 4
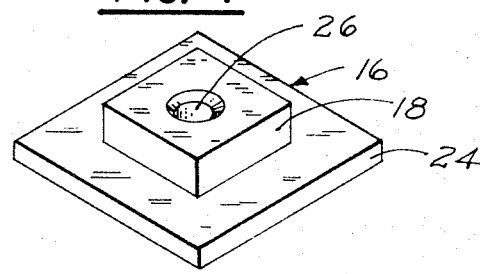
FIG. 5
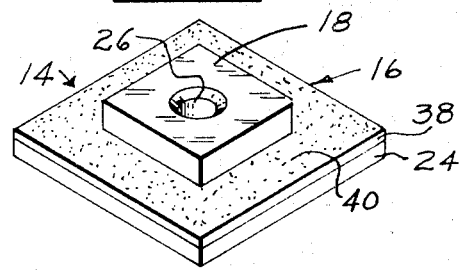
FIG. 6
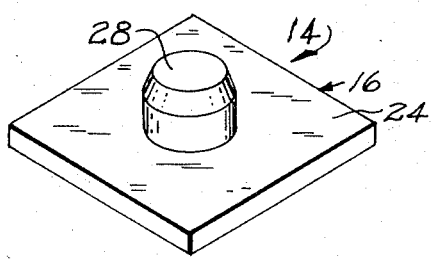
FIG. 7
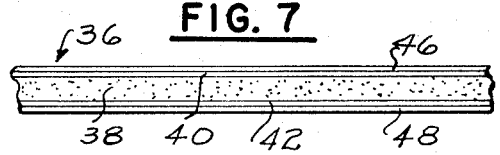
INVENTOR
FRANCIS E. RYDER
Olson, Trexler, Wolters & Bushnell
By                                Attys

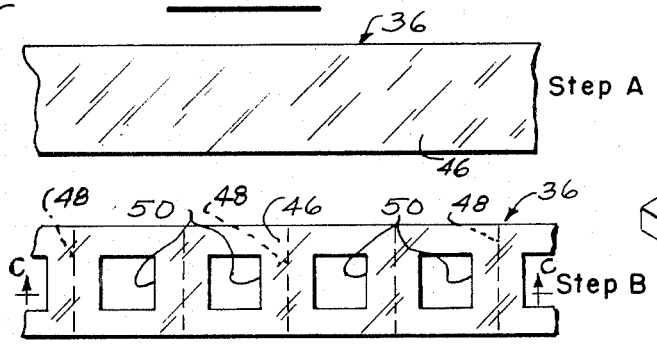
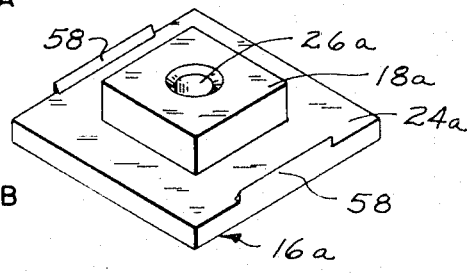
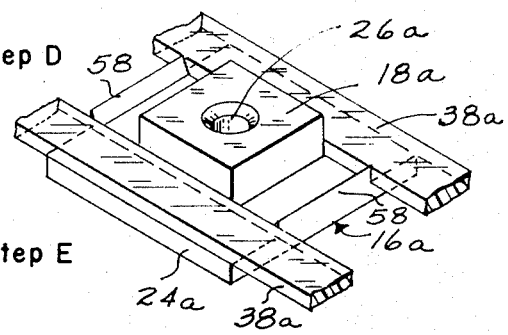
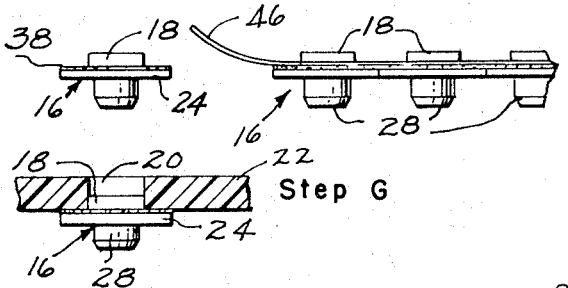
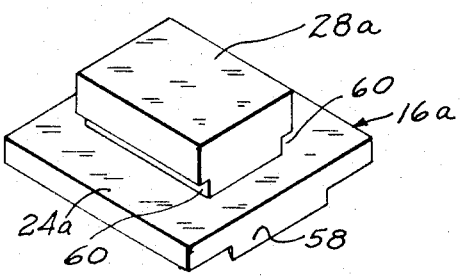
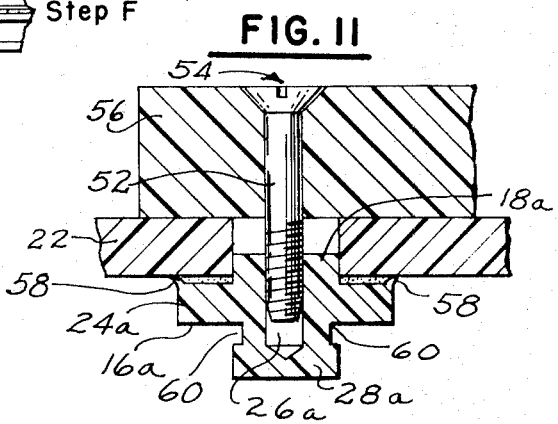
INVENTOR
FRANCIS E. RYDER

NUT TYPE FASTENER

SUMMARY OF THE INVENTION

The present invention has a very practical application in the fabrication of refrigerators and the like. For a number of years refrigerators were constructed with steel inner liners. It is now common practice to employ an inner plastic liner, as for example, a sheet of vacuum-formed styrene. It is also common practice to employ insulation material such as urethane or the like foamed in place between the inner liner and the outer sheet metal case of the refrigerator. In refrigerators which heretofore had an inner lining of sheet metal, it was possible to use rivets expandable by drive pins to mount brackets or shelf supports. Because of the variation in thickness of plastic inner liners, and because of the frangible characteristic of such plastic liners, the use of the above mentioned rivet type fasteners has in many instances not proven practical.

It is therefore one of the important objects of the present invention to provide a fastener which may be used to mount brackets and the like upon plastic materials such as vacuum formed styrene without the previous potential hazard of breakage, etc.

It is a further object of the present invention to provide fasteners of the above mentioned type which may be adhesively secured in position on one side of an apertured panel so as to pre-locate said fastener in position to accommodate a fastener shank inserted from the opposite side of the panel.

Still more specifically, the invention contemplates an arrangement whereby nut-type fasteners for the above mentioned purposes may be retained in strip form, thereby rendering them readily detachable before application to an apertured workpiece or panel.

The present invention contemplates a nut-type fastener of the above mentioned type which is particularly adapted for use with inner plastic liners of refrigerators to mount and seal brackets, shelves and the like upon the surface of the inner liner.

BRIEF DESCRIPTION OF THE DRAWINGS

The foregoing and other objects and advantages will be more apparent from the following detailed description when considered in connection with the accompanying drawing wherein:

FIG. 1 is a perspective view of a conventional refrigerator of the general type with which the fasteners of the present invention may be employed;

FIG. 2 is an enlarged fragmentary horizontal sectional view taken substantially along the line 2—2 of FIg. 1, more clearly to illustrate the adaptation of fasteners of the present invention to a plastic inner liner of a refrigerator;

FIG. 3 is an enlarged fragmentary sectional view taken substantially along the line 3—3 of FIG. 2;

FIG. 4 is a perspective view of the nut-type fastener member shown in FIG. 3 prior to the application of an adhesive thereto;

FIG. 5 is a perspective view similar to FIG. 4 after a sheet of adhesive material has been applied to the clamping surface thereof;

FIG. 6 is a perspective view disclosing the underside of the device illustrated in FIGS. 4 and 5;

FIG. 7 is an enlarged fragmentary side elevational view of a strip comprising outer sections of cellophane, an inner section of sealing material, and sections of adhesive material on opposite sides of said sealing stock, to which the cellophane strips are adhered.

FIG. 8 illustrates the steps in the assembly of the adhesive strips with the nut member, the severance of the nut member from said strip and the ultimate telescopic association of the severed member with an apertured panel;

FIG. 9 is a perspective view disclosing a nut member of slightly modified form prior to the application of the adhesive sealing material thereto;

FIG. 10 illustrates the nut member of FIG. 9 attached to two elongate sealing strips;

FIG. 11 is a central sectional view similar to FIG. 3, disclosing the nut member of FIGS. 9 and 10 supporting a bracket member upon a plastic inner liner panel; and FIG. 12 is a perspective view disclosing the opposite side of the nut member illustrated in FIG. 9.

DESCRIPTION OF THE PREFERRED EMBODIMENTS

Referring now to the drawings more in detail, wherein like numerals have been employed to designate similar parts throughout the various figures, it will be seen that a fastener representative of one embodiment of the present invention is designated generally by the numeral 14, FIGS. 2, 3 and 5. The fastener 14 includes a nut-body 16 comprising a first section 18 of polygonal shape adapted for telescopic association with the correspondingly shaped aperture 20 in a refrigerator inner liner or panel member 22, as clearly shown in FIG. 3. A second nut section 24 of increased diametric dimension radiates from the base of the first section 18. A central fastener shank accommodating aperture 26 extends through the nut sections 18 and 24 and into a section 28 oppositely disposed from the first section 18. The projection or section 28 is employed to afford adequate depth of the aperture 26.

The present invention has a very practical application in the fabrication of refrigerators employing plastic panels such as the previously mentioned panel 22. It has been common practice to use vacuum-formed styrene for inner liners of refrigerators. It is also common practice to flow suitable insulating material 30 such as urethane or the like into the area between the inner liner 22 and the outer sheet metal refrigerator housing 32. When sheet metal inner liners are used, it is possible to insert rivet type fasteners through apertures in the sheet metal inner liner for securing shelf brackets and the like in position. The use of such fasteners in plastic inner liners has not proven satisfactory for a number of reasons. For example, the thickness of plastic inner liners may vary and also stresses set up within the frangible styrene inner liner when such rivets are employed may result in cracking the material. In the use of plastic inner liners contemplated by the present invention it is necessary that the above mentioned nut-bodies 16 be secured in proper position, namely in telescopic association with their respective panel apertures 20, before the insulation material 30 is blown into the space between the inner liner and the outer refrigerator housing.

To accomplish this a series of steps designated as steps A to G, inclusive, FIG. 8, are employed. In step A an unperforated strip designated generally by the numeral 36 is shown. An enlarged edge view of the strip 36 also is shown in FIG. 7. The strip 36 comprises a central core 38, preferably in the form of adjacently arranged squares conforming in size and shape with the nut section 24. Opposed surfaces of the sealing strip 38 carry adhesives 40 and 42. A protective strip of release paper 46 superimposes the adhesive 40.

After the strip stock 36 has been formed as shown in step A, such strip is sheared so as to provide perforations 50 extending completely through strip sections 38, 40, 42 and 46 (see step B) perforations or apertures 50 being complemental in size and shape with the nut sections 18. Contemporaneously with the formation of the nut accommodating apertures 50, slits 48 may be formed. These slits 48 penetrate the sealing strip 38 and the adhesives 40 and 42, but do not penetrate the release paper strip 46, see step C, wherein the overall thickness of the strip 36 is exaggerated for clearness of illustration. The strip 36 is then telescopically associated with a series of sections 18 of nut-bodies 16, as shown in step D. In this position the nut-bodies are retained as a unit in a row by reason of the release paper 46. The nut sections 24 may now be peeled away from the release paper 46, as shown in step E, so as to expose the adhesive 40 on the upper side or surface of the sealing material 38, and each nut-body may individually be removed or separated, as shown in step F. The section 18 of the nut 24 thus separated from the row thereof may be telescopically associated with a complementary aperture 20 in the plastic panel 22, as illustrated in step G of FIg. 8. By pressing the nut section 24 against the panel, the nut-body is located and held in position to receive the entering extremity of a fastener shank such as a threaded shank 52 of a screw member 54, FIG. 3.

The shank 52 extends through a shelf bracket member 56 and when tightened in place the clamping side of the nut section 24 is pressed firmly against the adjacent surface of the panel 22. By having the nut sections 18 and the complementary panel apertures 20 polygonal in shape, the nut-body is secured against rotation as the screw member 54 is tightened in place. It will also be apparent that when the nut member is secured in position against the surface of the refrigerator lining panel 22, the material 38 provides an effective seal to prevent seepage of moisture through the apertures 20. In some applications, it may be desirable to also secure the shelf bracket 56 against rotation with respect to the inner liner 22. In such instances, it is only necessary to recess the attaching side of the bracket, as shown by the dot and dash lines in FIG. 3, and to increase the axial length of the nut section 18. With this arrangement the nut section 18 will be telescopically associated with the complementally shaped recess in the bracket.

In FIGS. 9 to 12 inclusive a slightly modified form of nut-type fastening member is shown, which is designated generally by the numeral 16a. The only significant structural differences between the nut-body 16a and the previously described nut-body 16 is the provision of oppositely disposed panel impinging, elongate teeth 58, and in the provision of a polygonally shaped section 28a. It will be noted that the polygonally shaped section 28a is formed with oppositely disposed longitudinal recesses 60, FIGS. 11 and 12. With this arrangement the nut members may be slidably retained in alignment within a suitable track (not shown). The elongate teeth or protuberances 38 are adapted to impinge the surface of the inner liner as clearly shown in FIG. 11. Sealing strips 38a extend along opposite sides of the nut section 18a and are adhered to the clamping surface of the nut section 24a. The sealing strips 24a perform the same function as the previously described sealing strip material 38, and the work impinging teeth 58 cooperate in providing the seal for the area not covered by sealing material. An aperture 26a is adapted to accommodate the shank 52 of the screw member 54 extending through the bracket member 56.

From the foregoing it will be apparent that the present invention contemplates the provision of a very simple and unique fastener to be used with apertured panels. When used with panels forming the inner liner of a refrigerator, the nut members may be telescopically associated with the rear side of the panel before insulation is flowed into the space between the inner liner and the outer metallic shell of the refrigerator. The nut-bodies are preferably made of impressionable plastic, and the thread convolutions of the fastener shank will indent or form complementary convolutions within the wall defining such apertures. In some instances, however, the nut may be provided with molded threads. In this manner, the screw members are secured against unauthorized removal. The above-described protective cellophane strip preserves the gripping effectiveness of the adhesive on opposite sides of the sealing material and greatly facilitates the ease with which such sealing material may be subsequently applied to the nut-bodies. The sealing material must be transversely scored so as to facilitate the ease with which each nut body may be separated from the strip. It has been found that the release paper may be in the form of commercially available material such as "MYLAR." The strip 36 may be withdrawn from a roll thereof, in which the release paper strip 46 is interposed between the two adhesive coatings 40 and 42.

I claim:

1. A nut-type fastener for application to an apertured panel, said fastener including an integral nut body of a plastic-like material having a first section adapted to be telescopically accommodated by a complementary shaped panel aperture, a second section of greater diameter than and extending radially outward from the base of said first section to present a panel clamping surface, said nut body being provided with an axially extending aperture having an open end at the extremity of said first section oppositely disposed from said clamping surface for accommodating a fastener shank, and sealing means carried by said clamping surface for providing a barrier against the seepage of moisture through said panel aperture, said sealing means including at least two strips of sealing material mounted on said panel clamping surface in spaced relation, said strips being disposed about a portion of the periphery of the base of said first section, and flexible protuberance means on said clamping surface disposed generally transverse to said sealing material and cooperating therewith to circumscribe the base of said first section, said flexible protuberance means extending generally to the level of the surface of said sealing strips, such that upon engagement of said fastener against a panel surface, said flexible protuberance means and said strips of sealing material will engage said panel surface and thereby provide said moisture barrier, and an adhesive coating associated with the upper surface of said sealing material for adhering said nut body to a panel surface upon telescopic association of said first section with a complementary panel aperture.

2. A nut-type fastener as defined in claim 1 wherein said first section is polygonal in shape, whereby upon engagement in said complementally shaped panel aperture, rotation of said fastener is precluded.

* * * * *